United States Patent
Snuverink Ook Lansink et al.

(10) Patent No.: US 8,257,543 B2
(45) Date of Patent: Sep. 4, 2012

(54) PROCESS FOR MAKING A LAYERED COMPOSITE STRUCTURE

(75) Inventors: Hermanus P. Snuverink Ook Lansink, Limbricht (NL); Hendricus F. Aussems, Heerlen (NL); Paul W. J. Heuvel Van Den, Maastricht (NL); Angelika Schmidt, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 466 days.

(21) Appl. No.: 11/921,506

(22) PCT Filed: May 30, 2006

(86) PCT No.: PCT/EP2006/005132
§ 371 (c)(1),
(2), (4) Date: May 2, 2008

(87) PCT Pub. No.: WO2006/131236
PCT Pub. Date: Dec. 14, 2006

(65) Prior Publication Data
US 2009/0023005 A1    Jan. 22, 2009

(30) Foreign Application Priority Data
Jun. 6, 2005 (EP) .................................. 05076314

(51) Int. Cl.
*B32B 27/36* (2006.01)
*C08G 63/12* (2006.01)
(52) U.S. Cl. .................. 156/325; 428/480; 528/296
(58) Field of Classification Search ............... 156/325; 428/480; 528/296
See application file for complete search history.

(56) References Cited

U.S. PATENT DOCUMENTS

| | | | | |
|---|---|---|---|---|
| 4,725,481 A | * | 2/1988 | Ostapchenko | 428/213 |
| 6,218,011 B1 | * | 4/2001 | Raetzsch et al. | 428/394 |
| 6,423,789 B1 | * | 7/2002 | Hayes | 525/437 |

FOREIGN PATENT DOCUMENTS

| | | | |
|---|---|---|---|
| GB | 1 507 821 | | 4/1978 |
| JP | 2001-233950 | | 8/2001 |
| JP | 2001233950 A | * | 8/2001 |
| WO | 97/23551 | | 7/1997 |
| WO | 01/68408 | | 9/2001 |
| WO | WO 0168408 A2 | * | 9/2001 |

OTHER PUBLICATIONS

International Search Report for PCT/EP2006/005132 mailed Aug. 29, 2006.

* cited by examiner

*Primary Examiner* — Katarzyna Wyrozebski Lee
*Assistant Examiner* — Daniel Lee
(74) *Attorney, Agent, or Firm* — Nixon & Vanderhye P.C.

(57) ABSTRACT

The invention relates to a process for the production of a layered composite structure comprising (1) a semi-permeable membrane made of a polymer composition comprising a polyetherester elastomer and (2) at least one web layer bonded to the membrane, wherein the process comprises a step wherein a melt layer of the polymer composition is applied onto the at least one web layer, and wherein the polyetherester elastomer comprises polyether soft segments formed from poly(alkylene-ether)glycols comprising alkylene-ether segments formed from ethylene oxide and polyester hard segments consisting of ester units derivable from short chain diols and dicarboxylic acid consisting of 98-65 mole % terephthalic acid (TPA), 2-35 mole % isophthalic acid (IPA) and optionally 0-20 mole % other dicarboxylic acids, wherein the mole % is relative to the total molar amount of dicarboxylic acid.

8 Claims, No Drawings

PROCESS FOR MAKING A LAYERED COMPOSITE STRUCTURE

This application is the U.S. national phase of International Application No. PT/EP2006/005132 filed 30 May 2006 which designated the U.S. and claims priority to European Patent Application No. 05076314.3 filed 6 Jun. 2005, the entire contents of each of which are hereby incorporated by reference.

The invention relates to a process for the production of a layered composite structure as well as to a layered composite structure comprising (1) a semi-permeable membrane made of a polymer composition comprising a polyetherester elastomer and (2) at least one web layer bonded to the membrane.

Such a layered composite structure is known from EP-0708212-B1. In the known layered composite structure of EP-0708212-B1, a barrier layer consisting of a polyetherester elastomer (TPE-E) film is bonded to two non-woven layers made of polyester fibers, one non-woven layer at each side of the film. The said two non-woven layers and the barrier layer are bonded to each other with a water and water-vapour resistant adhesive. This bonding technique will be referred in this description as "lamination". The barrier layer is said to be water-swellable, permeable to water-vapour and impermeable to water. In this application such a barrier layer and a semi-permeable membrane are considered to be equivalent. The TPE-E in the known layered composite structure is Hytrel 8206 HTR from the company DuPont, which is a TPE-E type block copolymers with EO/PO soft blocks and hard blocks composed of polyester segments derived from terephthalic acid and butanediol, also known as polybutylene terephtalate (PBT) hard blocks.

In the same patent EP-0708212-B1 also a layered composite structure is described which is made by "Aufextrudieren", in other words "extrusion coating", which corresponds in general terms with a melt process. The polymer that is used in said process for making the barrier layer is a thermoplastic polyurethane or a polyetherpolyamide block-copolymer (TPE-A). In the extrusion coating process, described in EP-0708212-B1, the polymer is extruded onto one web layer and then the second web layer is pressed onto the other side of the polymer layer.

Melt processes in general and extrusion coating in particular are considered economically more favorable than lamination, since melt processes effectively combine production of the barrier layer and bonding of the barrier layer to one or two web layers in one step. Extrusion is particularly preferred for formation of "endless" products, i.e. for products which emerge at continuous length. It has been observed by the inventors, however, that if the extrusion process is applied with a water-swellable TPE-E like the one that is described in EP-0708212-B1, i.e. a TPE-E with PBT hard blocks and with EO/PO soft blocks, a number of problems occur. One of the problems is that the adhesion of the barrier layer to the web layers is insufficient. This becomes evident in particular when the layered composite structure is subjected to moisture and when the web layer or layers are made of an apolar material such as polyolefines. Already under dry conditions the adhesion is weak and as a result of swelling of the barrier layer under wet conditions extensive local debonding of the barrier layer and the web layers occur.

More or less the same problem has been described in EP-0708212-B1 to occur after swelling for a layered composite structure comprising a barrier layer comprising a hydrophilic water-swellable TPE-E bonded to one web layer. This problem is solved in EP-0708212-B1 with a layered composite structure with two web layers bonded to the barrier layer. This might likewise work for a lamination process wherein a water resistant adhesive is used in combination with a barrier layer made of the said TPE-E, but apparently it does not for a melt process like extrusion coating.

A further disadvantage of the known layered composite structure comprising a barrier layer comprising a hydrophilic water-swellable TPE-E is that the water resistant adhesive can reduce the water-vapour permeability of the membrane.

The aim of the invention is therefore to provide a melt process for making a layered composite structure with a semi-permeable membrane made of a hydrophilic TPE-E that does not have the problems of the known process, or at least so in a lesser extent.

This aim has been achieved with the process according to the invention, wherein a melt layer of a polymer composition comprising a polyetherester elastomer is applied onto at least one web layer, and wherein the polyetherester elastomer (TPE-E) comprises:

polyether soft segments formed from poly(alkylene-ether) glycols comprising alkylene-ether segments formed from ethylene oxide and polyester hard segments consisting of ester units derivable from short chain diols and dicarboxylic acid consisting of 98-65 mole % terephthalic acid (TPA) and 2-35 mole % isophthalic acid (IPA) and 0-20 mole % other dicarboxylic acids, or alkyl ester derivatives of the carboxylic acids, the mole % relative to the total molar amount of dicarboxylic acid.

The effect of the use of the said TPE-E in the process according to the invention is that a better adhesion is obtained between the barrier layer and the web layer or layers in both dry and wet conditions, compared to the corresponding process wherein a TPE-E polyester is used with hard segments consisting of ester units derivable from short chain diols and dicarboxylic acid, or an alkyl ester derivative thereof, consisting of 100 mole % terephthalic acid (TPA). A further advantage is that since no separate water resistant adhesive has to be used to obtain good adhesion; the negative effect thereof on the water vapour permeability properties of the membrane can thus be eliminated.

This effect of improved adhesion is surprising in view of the following observations by the inventors: the melt process described above is known to be already commercially applied for the production of layered composite structures making use of a polymer composition comprising a polyetherester elastomer based on polybutylene terephtalate (PBT) hard blocks and polytetramethylene glycol soft blocks. This process results in layered composite structures with a good adhesion between the polymer layer and the membrane layer or layers. This TPE-E however, is fairly hydrophobic and practically non-swelling. In the experiments executed by the inventors wherein the polytetramethylene glycol soft blocks are replaced by the more hydrophilic poly(alkylene-ether) glycols comprising alkylene-ether segments formed from ethylene oxide in order to make the polymer film more permeable to water vapour, the adhesion deteriorated severely as according to the results described above. In an attempt to reach a compromise between the water vapour permeability and adhesion properties, additional experiments were performed with a mixture of two TPE-E's: one TPE-E with soft blocks based on the poly(alkylene-ether)glycols comprising alkylene-ether segments formed from ethylene oxide and the other TPE-E comprising the polytetramethylene glycol soft blocks. However, even with a very large content of the second TPE-E no significant improvement in adhesion was observed.

The polyetherester elastomer (TPE-E) that is used in the process according to the invention comprises polyether soft segments formed from poly(alkylene-ether)glycols comprising alkylene-ether segments formed from ethylene oxide and polyester hard segments consisting of ester units derivable from short chain diols and dicarboxylic acid consisting of 98-65 mole % terephthalic acid (TPA) and 2-35 mole % isophthalic acid (IPA).

Such polyetherester elastomers are known per se, and described for example in U.S. Pat. No. 5,116,937. This patent mentions that these elastomers can be used in fibres, films and moulded articles, but relates in particular to artificial fishing lures. The patent does not relate to a process for producing a layered composite structure and does neither disclose nor suggest the advantageous effect thereof as according to the present invention.

Poly(alkylene ether)glycols from which the soft segments in the TPE-E are formed may have a molecular weight varying over a wide range. Preferably the poly(alkylene ether)glycol has a weight average molecular weight (Mw) in the range of about 500 to about 6000, more preferably 2000-4500. Also the content of alkylene-ether segments formed from ethylene oxide may vary over a wide range, typically 5-100 wt. %, relative to the weight of the poly(alkylene-ether)glycol. Preferably, the poly(alkylene ether)glycol comprises at least 30 wt. %, more preferably at least 50 wt. %, alkylene-ether segments formed from ethylene oxide, wherein the wt % is relative to the weight of the poly(alkylene-ether)glycol. The advantage of a higher ethylene oxide wt. % is that the membrane in the resulting layered composite construction has a higher water vapour permeability.

Specific examples of poly(alkylene ether)glycols comprising alkylene-ether segments formed from ethylene oxide useful in the TPE-E include poly(ethyleneoxide)glycol also known as poly(ethylene glycol), copolymers of ethylene glycol and other glycols like 1,3-propylene glycol and 1,4-butylene glycol, block-copolymers of poly(ethylene glycol) and other poly(alkylene-ether)glycols like poly(1,3-propylene glycol), poly(1,4-butylene glycol), poly(tetrahydrofuran), poly(pentamethylene glycol), poly(hexamethylene glycol), and poly(hepthamethylene glycol), and bishydroxyphenyl ethoxylates like 4,4'-isopropylidenediphenol ethoxylate (Bisphenol A ethoxylate), and 4,4'-(1-phenylethylidene) bisphenol ethoxylate (Bisphenol AP ethoxylate), and mixtures derived thereof. An example of a suitable block-copolymer of poly(ethylene glycol) is poly(propylene-ether)glycol end-capped with poly(ethylene-ether) segments, also known as EO/PO block copolymer. Preferably, the polyether soft segments are formed from a poly(ethylene-oxide)glycol or from a EO/PO block copolymer consisting of a poly(propylene-ether)glycol end-capped with poly(ethylene-ether) segments.

Next to the poly(alkylene ether)glycols comprising alkylene-ether segments formed from ethylene oxide, the TPE-E may comprise soft segments derived from other poly(alkylene ether)glycols, for example, poly(propylene)glycol and poly(tetramethylene)glycol. Preferably, the content of the other poly(alkylene ether)glycols is such that content of alkylene-ether segments formed from ethylene oxide in the TPE-E is at least 30 wt. %, more preferably at least 50 wt. %, relative to the total weight of the poly(alkylene-ether)glycol. Also preferably, the TPE-E does not comprise such other poly(alkylene ether)glycols at all.

Short chain diols useful in the TPE-E include non-substituted, substituted, straight chain, branched, cyclic aliphatic, aliphatic-aromatic and aromatic diols having from 2 carbon atoms to 36 carbon atoms. Specific examples of the desirable short chain diol include ethylene glycol, propylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, 4,8-bis(hydroxymethyl)-tricyclo[5.2.1.0/2.6]decane, 1,4-cyclohexanedimethanol, isosorbide, di(ethylene glycol), tri(ethylene glycol) and mixtures derived therefrom. Essentially any glycol known can be used. Preferably, the short chain diols are selected from the group consisting of ethylene glycol, propylene glycol, 1,3-propanediol, 1,4-butanediol and mixtures thereof, more preferably the short chain diols consist of ethylene glycol and/or 1,4-butanediol. The advantage of the preferred diols is that the membrane better retains its consistency and mechanical properties at elevated temperature.

The dicarboxylic acid components from which the TPE-E used in this invention can be made, may comprise, apart from terephthalic acid (TPA) and isophthalic acid (IPA), up to and including 20 mole %, preferably at most 10 mole %, or at most 5 mole % other dicarboxylic acids. Suitable other dicarboxylic acids include aromatic dicarboxylic acids like naphthanates and bibenzoates, and aliphatic dicarboxylic acids, like oxalic acid, malonic acid, succinic acid, and mixtures thereof.

For the preparation of these polyetherester elastomer, instead of the dicarboxylic acids, also use can be made of an ester derivative thereof, such as dimethyl terephthalate (DMT) and dimethyl isophthalate (DMI).

In a preferred embodiment, the dicarboxylic acid components don't comprise other dicarboxylic acids and consist of 95-65 mole % TPA and 5-25 mole % IPA, more preferably 90-80 mole % TPA and 10-20 mole % IPA, or an ester derivative thereof.

The TPE-E that is used in the present invention may also comprising a polyfunctional branching agent. Polyfunctional branching agents that can be used in the TPE-E include any agents having three or more carboxylic acid functions, hydroxy functions or mixtures thereof. Branching agents, if any, are typically used in an amount of 0.01-2.0 mole %, more preferably 0.1-1 mole %, relative to the total molar amount of dicarboxylic acid.

In a preferred embodiment, the polyetherester elastomer that is used for the production of the layered composite structure consists of soft segments formed from a poly(ethylene-oxide)glycol or from a EO/PO block copolymer consisting of a poly(propylene-ether)glycol end-capped with poly(ethylene-ether) segments, hard segments consisting of ester units derivable from ethylene glycol and/or butane diol as short chain diol and 95-65 mole % TPA and 5-25 mole % IPA as dicarboxylic acid, and optionally a branching agent.

The TPE-Es used in the process according to the invention can be prepared by conventional polycondensation techniques. Well known methods include the reaction of diol monomers with acid chlorides. Such procedures are described, for example, by R. Storbeck, et al., in J. Appl. Polymer Science, Vol. 59, pp. 1199-1202 (1996). Other methods include the melt polymerization method, wherein the dicarboxylic acid component (as acid or as an ester derivative thereof, or as a mixture thereof, the short chain diol and the poly(alkylene-ether)glycol and optionally the polyfunctional branching unit, are combined in the presence of a catalyst and heated to a high enough temperature that the monomers combine to form esters and diesters, then oligomers, and finally polymers.

The polymer composition that is used in the process according to the invention for making the membrane layer can comprise, next to the TPE-E, additives known for use in polyetherester compositions. Such additives can include thermal stabilizers such as, for example, phenolic antioxidants; secondary thermal stabilizers such as, for example, thioethers and phosphates; UV absorbers such as, for example benzophenone- and benzotriazole-derivatives; and/or UV stabilizers such as, for example, hindered amine light stabilizers, (HALS) and carbon black. Other additives that can be used include plasticizers, processing aids, flow enhancing additives, lubricants, pigments, flame retardants, impact modifiers, nucleating agents to increase crystallinity, antiblocking agents such as silica, and base buffers such as sodium acetate, potassium acetate, and tetramethyl ammonium hydroxide.

The polymer composition can also comprise inorganic, organic and/or fillers, such as, for example, talc, mica, wollastonite, montmorillonite, chalk, diatomaceous earth. Preferably clay fillers are used which can exfoliate to provide nanocomposites. This is especially true for the layered silicate clays, such as smectite clays, magnesium aluminum silicate, bentonite clays, montmorillonite clays, and hectorite clays. Such clays can be natural or synthetic, treated or not. The particle sizes of fillers for use in the polymer composition can be within a wide range. As known to those skilled in the art, the filler particle size can be tailored based on the desired use of the layered composite structure comprising the semi-permeable membrane. It is, generally preferred that the average diameter of the filler be less than about 40 microns. More preferably, the average diameter of the filler is less than about 20 microns. However, fillers having diameters outside the preferred ranges can be used. The filler can include particle sizes ranging up to 40 mesh, (US Standard), or larger. Mixtures of filler particle sizes can also be advantageously used.

The web layer that can be used in the process according to the invention can be any web layer that is suitable as a substrate or support layer for the semi-permeable membrane. Such web layers are preferably water and water vapour resistant, light weight and tear resistant. The web layer may be either of both woven and non-woven. Also combinations of different types of web layers can be used. These web layers can be produced by known methods from both natural and industrial materials.

Preferably, the web layers comprise, or consist of, fibres made of a polyolefine, like polyethylene and polypropylene, polyester or other thermoplastic polymer. Preferably, the at least one web layer that is used in the process according to the invention is a woven or non-woven fibrous layer comprising polyolefine fibres. The advantage is that with polyolefine fibres the largest improvement in adhesion is obtained.

For the application of the polymer melt onto the at least one web layer, any process that is suitable for applying a polymer melt layer may be used. Suitable processes are, for example, extrusion coating and calendaring. In the process according to the invention, the polymer melt can be applied to either one web layer or to two web layers. In the embodiment wherein the polymer melt is applied to two web layers, the melt may applied simultaneously to both web layers, for example, by melt extrusion in between the two web layers, or sequentially, for example by extrusion of the melt on one web layer and subsequently pressing the second web layer on the top surface of the melt. The two web layers that are used in this process may be the same, but also a combination of two different web layers may be used.

The thickness of the semi-permeable membrane layer in the layered composite structure obtained by the process according to the invention may vary over a wide range, e.g. in the range of 5-500 µm. Preferably, the thickness lies in the range of 10-100 µm, more preferably 20-40 µm.

The invention also relates to the layered composite structure obtainable with the process according to the invention, and any (preferred) embodiment thereof. The layered composite structure resulting from the process according to the invention may be a composite structure with only one web layer bonded to one side of the membrane, or with two web layers, one bonded at each side of the membrane.

The invention also relates to the use of the layered composite structure obtainable with the process according to the invention in building and construction applications. The advantage of the layered composite structure according to the invention is the good adhesion even under wet conditions and the water vapour permeability combined with water tightness.

The invention is further elucidated with the following Examples and Comparative Experiments.

Materials

For the experiments granulates of polyether ester compositions prepared from dimethyl terephthalate (DMT), dimethyl isophthalate (DMI), butane diol, and different polyols, were used. For the preparation industrial grade materials were used. The compositions of the various polyether esters used are indicated in Table I. For the polyols, the following abbreviations are used: PEG 2000 (PEG with a Mn of about 2000 g/mol); PE-3500 (pEO/pPO/pEO triblock copolymer with a Mn of about 2200 g/mol and 33 wt % pPO); PE-6200 (pEO/pPO/pEO triblock copolymer with a Mn of about 2200 g/mol and 67 wt % pPO); p-THF (polytetrahydrofurane, also indicated as polytetramethyleneglycol, with an Mn of about 2000).

Coating Experiments

The polyether ester granulates were fed into an extruder and extruded at a temperature of 250-255° C. through a slit dye and extrusion coated into the gap between co-rotating fleeces of non-woven polyolefine layers, thus forming a construction of a polymer film with a thickness of about 25 µm, sandwiched between the two non-woven polyolefine layers.

Adhesion Test

For the adhesion tests it was attempted to pull the two non-woven polyolefine layers apart. After separation the layers were inspected as to whether delamination of the layers has occurred due to cohesive failure of the polymer film, as evidenced by rupture within the polymer film and retention of parts of the polymer film on both polyolefine layers, adhesive failure between the polymer film and polyolefine layers, as evidenced by separation of the polymer film from one or both polyolefine layers with absence of both rupture of the film and absence of fiber pull out, or due to cohesive failure of polyolefine layers as evidenced from fiber pull out of one or both polyolefine layers. The test results have been collected in Table 1. No significant differences have been observed in the test results between tests performed on dry samples and tests performed on samples wetted by soaking and equilibrating for 24 hours in water.

TABLE 1

Polyetherester composition and adhesion test results for Examples I-III and Comparative Experiments A-F

| | Ex. I | Ex. II | Ex. III | CE-A | CE-B | CE-C | CE-D | CE-E | CE-F |
|---|---|---|---|---|---|---|---|---|---|
| Polymer composition | | | | | | | | Blend of 20 wt. % CE-D 80 wt. % CE-F | |
| DMT (mole %) | 85 | 85 | 85 | 100 | 100 | 100 | 100 | | 100 |
| DMI (mole %) | 15 | 15 | 15 | 0 | 0 | 0 | 0 | | 0 |
| Butane diol | + | + | + | + | + | + | + | | + |
| Polyol Type | PEG2000 | PE3500 | PE6200 | PEG2000 | PE3500 | PE6200 | PE6200 | | pTHF |
| Amount Polyol (wt. %) | 35 | 40 | 40 | 35 | 40 | 40 | 55 | | 60 |
| Adhesion | A-F | A-F | A-PF | N | N | N | N | N | A-F |

A-F = good adhesion with extensive fibre pull out;
A-PF = adhesion with partial fibre pull out;
N = negative test result, no adhesion, absence of fiber pull out.

The invention claimed is:

1. Process for the production of a layered composite structure comprising (1) a semi-permeable membrane made of a polymer composition comprising a polyetherester elastomer and (2) at least one web layer bonded to the membrane, wherein the process comprises applying a melt layer of the polymer composition onto the at least one web layer, wherein the polyetherester elastomer consists of:

polyether soft segments formed from poly(alkylene-ether) glycols, wherein at least 50 wt. %, relative to the weight of the poly(alkylene-ether) glycols, of alkylene-ether segments are formed from ethylene oxide, and polyester hard segments consisting of ester units derivable from short chain diols and dicarboxylic acid consisting of 98-65 mole % terephthalic acid (TPA), 2-35 mole % isophthalic acid (IPA) and optionally 0-20 mole % other dicarboxylic acids, wherein the mole % is relative to the total molar amount of dicarboxylic acid.

2. Process according to claim 1, wherein the polyether soft segments are formed from a poly(ethylene-oxide)glycol or from a EO/PO block copolymer consisting of a poly(propylene-ether)glycol end-capped with poly(ethylene-ether) segments.

3. Process according to claim 1, wherein the short chain diols are selected from the group consisting of ethylene glycol, propylene glycol, 1,3-propanediol and 1,4-butandediol, and mixtures thereof.

4. Process according to claim 1, wherein the dicarboxylic acid consists of 95-75 mole % TPA and 5-25 mole % IPA.

5. Process according to claim 4, wherein the dicarboxylic acid consists of 90-80 mole % TPA and 10-20 mole % IPA.

6. Process according to claim 1, wherein the at least one web layer is a woven or non woven fibrous layer comprising polyolefine fibres.

7. Process according to claim 1, wherein the polymer melt is applied to two web layers and the layered composite structure resulting from the process comprises the membrane bonded to the two web layers one at each side of the membrane.

8. Process according to claim 1, wherein the semi-permeable membrane is made of a polymer composition which consists of the polyetherester elastomer and at least one additive selected from the group consisting of thermal stabilizers, UV absorbers, UV stabilizers, plasticizers, processing aids, flow enhancing additives, lubricants, pigments, flame retardants, impact modifiers, nucleating agents, antiblocking agents, base buffers, and filler.

* * * * *